Dec. 30, 1958   V. C. SMITS   2,866,950
MICROWAVE POWER MEASUREMENT DEVICE
Filed May 31, 1955
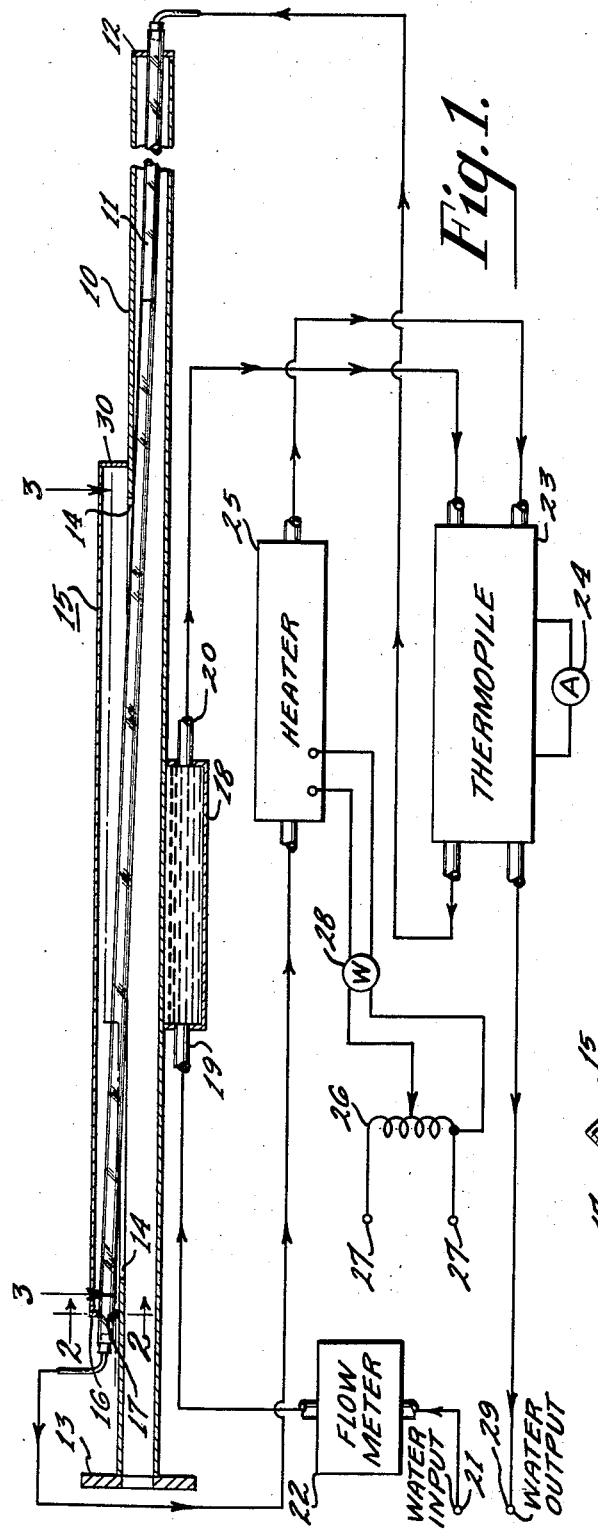
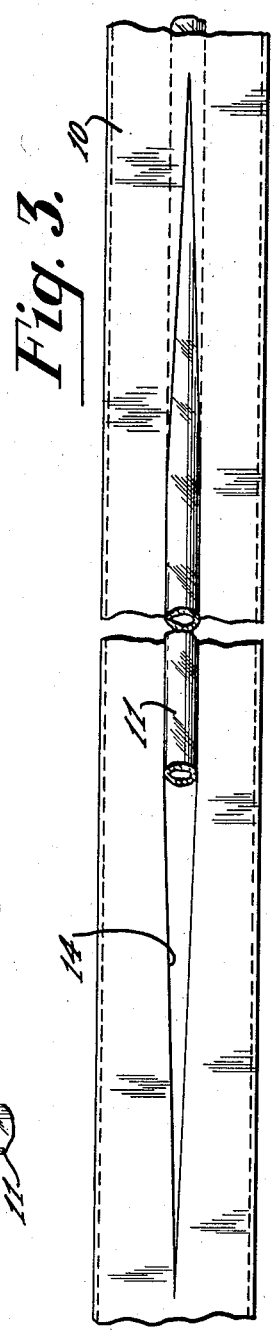
INVENTOR.
Vernon C. Smits
BY
Morris ...
ATTORNEY.

United States Patent Office 2,866,950
Patented Dec. 30, 1958

2,866,950

MICROWAVE POWER MEASUREMENT DEVICE

Vernon C. Smits, East Orange, N. J., assignor to Radio Corporation of America, a corporation of Delaware Application May 31, 1955, Serial No. 512,174

The terminal fifteen years of the term of the patent to be granted has been disclaimed 2 Claims. (Cl. 333—22)

The present invention relates to a microwave power measurement device, and more particularly to an improved device for calorimetric measurement of microwave power.

Calorimetric measurements of microwave power may be made by noting the rise in temperature of a fluid flowing at a fixed rate through a microwave transmission medium. The rise in temperature is a function of the microwave power absorbed by the fluid. Devices for calorimetric microwave power measurements are referred to generally as calorimeter wattmeters or water loads, and the former term will be used herein.

A principal shortcoming of known calorimeter wattmeters operating at microwave frequencies is the limited inherent bandwidth over which they may operate at maximum efficiency. The criterion for maximum efficiency is an impedance match between the calorimeter wattmeter and the microwave system in which it is used. Microwave energy is reflected when an impedance match does not exist. Reflections are shown by an increased standing wave ratio.

To obtain an impedance match, conventional calorimeter wattmeters have employed tuning screws. Tuning screws produce resonant effects in microwave structures. The bandwidth over which the wattmeter efficiently operates is, therefore, limited. Moreover, arcing and breakdown occur at the tuning screws when high power microwaves are applied to the wattmeter.

A source of error in a calorimeter wattmeter arises from the thermal conductivity of the wattmeter structure. Dissipation of heat from the fluid through the wattmeter structure is one cause of error. An alternative cause of error is the absorption of heat by the fluid.

By means of the present invention, an improved calorimeter wattmeter is provided which may be operated over a large bandwidth at maximum efficiency. Microwave power measurements, made with a wattmeter provided by the present invention, will be more acurate than heretofore obtainable.

In one embodiment of the present invention, a terminated waveguide section is provided. Microwave energy is applied at one end of the guide. This energy is absorbed in a stream of fluid, such as water. Water flows through a suitable dielectric conduit which is exposed to the microwave energy in the waveguide. The temperature rise of the fluid in passing through the guide is determinative of the power applied to the wattmeter.

In order to provide minimum reflection, the fluid is taken into the guide through a slot having a configuration which has been found to cause little or no reflections. A cover is placed over the slot which is shaped to have characteristics such that minimum reflections are produced while the escape of power from the guide is prevented. Errors in power measurement owing to the thermal conduction are prevented by keeping the temperature of the wattmeter structure constant.

It is an object of the present invention to provide an improved device for the calorimetric measurement of microwave power.

It is a further object of this invention to provide a calorimeter wattmeter which measures microwave power over a broad band of frequencies with high efficiency and without the necessity for continuous adjustment.

It is a still further object of this invention to provide a calorimeter wattmeter in which errors due to thermal conductivity are minimized.

Other objects and advantages of the present invention will, of course, become apparent and immediately suggest themselves to those skilled in the art to which the invention is directed from a reading of the following specification in connection with the accompanying drawing in which:

Figure 1 is a schematic presentation of a calorimeter wattmeter which is constructed according to the present invention;

Figure 2 is a sectional view of the wattmeter structure shown in Figure 1, the section being taken along the line 2—2 as viewed in the direction of the arrows; and Figure 3 is another sectional view of the wattmeter structure shown in Figure 1, the section being taken along the line 3—3 as viewed in the direction of the arrows.

Referring to Figure 1, the calorimeter wattmeter includes a section of a waveguide 10 having a glass tube 11 therein. The glass tube 11 in the waveguide 10 is exposed to the electromagnetic field, such as may be established by a source of microwave energy. A suitable dielectric fluid, such as water, is made to flow through the tube 11. A stream of water, therefore, flows through the waveguide 10 at a rate which is desirably constant. Any substantially rigid tube made from a suitable dielectric material may be used in place of the glass tube 11. The waveguide section 10 is terminated at one end 12 through which the tube 11 extends. A flange 13 is connected to the waveguide at the opposite end so that the calorimeter wattmeter may be coupled to a microwave system wherein power is to be measured.

As water flows through the glass tube, it absorbs energy from the electromagnetic field in the waveguide and converts this energy into heat which raises the water temperature. The energy absorbed by the water is governed by the following equation:

$$P = 0.0687 \times F \times T$$

In this equation, P equals the average power absorbed in watts, F equals water flow rate in cubic centimeters per minute, and T equals temperature rise in degrees centigrade.

It may be observed from the above equation that the only power measured should be the power absorbed. In order to maintain accuracy of the measurement, the conditions to be observed are (1) that substantially maximum power is absorbed by the water, and (2) that heat conduction, either into or from the water, is a minimum. It is desirable to prevent heat conduction into the water from other sources than the source of incident microwave power. The first criterion is met over a large range of frequencies by apparatus embodying the present invention.

For maximum absorbed power the impedance of the wattmeter must be equal to the impedance of the source of microwave energy which is to be measured. An impedance match at microwave frequencies is manifested by the voltage standing wave ratio (VSWR). A perfect match is designated by a VSWR which is equal to unity. Reflections increase the standing wave ratio. To obtain accurate measurements with a calorimeter wattmeter over a wide band of frequencies, it is desirable to maintain the VSWR, measured at the wattmeter, substantially equal to unity over the entire frequency band.

Errors due to thermal conductivity must also be minimized. Conduction of heat into the fluid used in the wattmeter, from sources other than the incident microwave energy, is as detrimental to accuracy as conduction of heat away from the fluid. According to the present invention, errors due to thermal conductivity are minimized.

First, the improvements afforded by the present invention to provide an impedance match and substantially unity standing wave ratio over a wide band of frequencies will be considered. The section of waveguide 10, illustrated in Figure 1, has a rectangular cross-section. An entrance into the waveguide 10 for the tube 11 is provided through a slot 14 on one of the side walls of the waveguide 10. To prevent any impedance mismatch and subsequent reflections, the slot 14 is tapered at each end. It has been found that a slot shape, as indicated, has a VSWR approximately equal to unity over a wide frequency band. Figure 3 presents a view illustrating the shape of a slot of the type contemplated. The width of the slot is approximately equal to the outside diameter of the tube 11 so that the tube fits tightly into the slot. The length of the slot 14 determines the angle between tube 11 and the wall of the waveguide 10 through which the tube 11 enters the waveguide 10. This is the angle at which the tube 11 enters the guide. It is desirable to make this angle a very small acute angle. A large angle will give rise to reflections and prevent the successful operation of a wattmeter over a large band of frequencies. In order to illustrate the magnitude of this angle, an angle of 2.5° is suitable for calorimeter wattmeters operating at frequencies in the range of 8,000 mc. to 10,000 mc.

A cover 15 may be placed over the slot 14 to prevent power leakage therefrom. This cover 15 may be made from sheet metal and bent at an angle so that it has a triangular cross-section. The length of this cover is slightly greater than the length of the slot 14. Two triangular plates 16 and 30 are placed at either end of the cover 15. An opening 17 is provided in the forward end plate 16 so that the tube 11 may project therethrough. A cross-sectional view of the triangular cover 15, taken through the forward end plate 16, is shown in Figure 2.

The triangular cover 15 is used to prevent power leakage without producing resonant conditions by virtue of a cavity formed by the cover. A resonant member in the wattmeter would make the structure thereof frequency sensitive, thereby preventing the existence of an impedance match between the wattmeter and the source of power over a broad band of frequencies.

Errors due to heat conduction may be minimized by reducing the thermal conductivity of the tube 11 through which the fluid passes. For greatest accuracy, the wall thickness of the glass tubing used in constructing the tube 11 should be large enough to insulate the heated water from the waveguide 10. To illustrate the thickness of the tubing which may be used in calorimeter wattmeters operating in the power range of 200 kilowatts, a wall thickness of 40 mils is suitable.

To minimize the effects of heat conduction losses, the flow rate should be adjusted so that only a small temperature rise of a few degrees centigrade, for example, occurs between the incoming and outgoing water.

Inaccuracies due to heat conduction may be further eliminated, according to the present invention, by means of a reservoir 18 or water jacket that is attached to the waveguide 10. This reservoir 18 may be a rectangular box, as shown illustratively in the drawing, having inlet and outlet connectors 19 and 20. Inaccuracies are caused by the loss of heat from the fluid in the tube 11. However, inaccuracies are also produced by the absorption of heat by the water from other sources than the incident power to be measured. For example, heat may be absorbed from the walls of the waveguide 10. This effect is most troublesome when the incident power is temporarily interrupted, such as at times when a series of recurrent measurements are to be made. Heat from the walls of the waveguide 10 is then absorbed by the fluid and power will appear to be measured for an interval after power cut-off. With the reservoir 18 attached to the waveguide, the power measured falls to zero almost immediately after the power from the source is turned off.

If a small reservoir is used, it may be desirable to attach it to the waveguide at a point close to the region where the most power is absorbed by the water. In this embodiment of the present invention, the greatest amount of power is absorbed in the region where the glass tube 11 enters the waveguide 10. Consequently, the reservoir 18 is attached to the lower wall of the waveguide 10 and directly under the slot 14. A larger reservoir or water jacket may be used if desired.

The calorimeter wattmeter, constructed in accordance with the present invention, will have few sharp projections into the waveguide at which arcing and breakdown may occur. However, it may be desirable to pressurize the interior of the waveguide when excessively high powers are to be measured. In that case, an airtight seal (not shown) may be provided by means of a sealing compound, for example, where the cover 16 and the waveguide 10 are joined. The seal may also be provided at the hole 17 through which the tube 11 enters the end 16 of the cover 15, and at the hole in the termination end 12 of the waveguide 10 through which the tube 11 leaves the waveguide.

Figure 1 diagrammatically illustrates the flow system and auxiliary equipment associated with the calorimeter wattmeter. Water enters through an input connection 21 and passes through a flowmeter 22 by which the flow rate can be monitored. The flow rate should be maintained constant throughout all measurements. Cool water, passing through the flowmeter 22, enters the reservoir 18 through the inlet connection 19 and leaves the reservoir 18 through the outlet connection 20. A continuous flow of cool water in contact with the surface of the waveguide 10 is thereby provided. The water then flows through the cool side of a thermopile 23. The thermopile 23 is a known device consisting of a plurality of thermocouple elements connected in series. Thermocouples are arranged alternately in the cool water stream and in the heated water stream. The ammeter 24 that is connected to the thermopile 23 provides an indication of the difference in temperatures between the cool water stream and the heated water stream. A commercially available thermopile may be used in practicing the present invention.

Upon leaving the thermopile 23, the cool water passes through the tube 11. The water is heated by energy absorbed in passing through the waveguide 10. This heated water passes through a heater 25 which may be a tube having a heating element contained therein. Power for the heating element is supplied through a variable auto-transformer 26 which may be connected to a source of available power by means of terminals 27. A wattmeter 28 is connected to measure the power delivered to the heater 25. The heated water enters the hot side of the thermopile 23 after passing through the heater 25 and proceeds to the water output connection 29.

The power may be measured by using the calorimeter wattmeter of the present invention in the following manner: Water is allowed to flow through the system and a power measurement is made with the source of microwave energy in operation and with the heater 25 inoperative. A reading is then observed on the ammeter 24. The power from the microwave source is then cut-off. Sufficient current is supplied through the auto-transformer 26 so that the water is heated by means of the heater 25 until the same reading is observed on the ammeter 24. The wattmeter 28 therefore indicates an amount of power equal to the power which had been previously supplied by the source of microwave energy.

What is claimed is:

1. A calorimeter wattmeter comprising a section of waveguide formed by rectangularly disposed enclosing walls, a slot tapered acutely at its front and rear ends in one wall of said waveguide, a cover disposed over said slot, a tube passing through said waveguide, said tube extending under said cover and through said slot into said waveguide, a jacket in contact with at least one of said walls of said waveguide in a heat transfer relationship therewith, and means connected to said jacket for passing a fluid through said jacket.

2. A calorimeter wattmeter comprising a rectangular waveguide having four rectangularly disposed and conductive enclosing walls, a conductive termination at one end of said waveguide, an acuately tapered slot in one wall of said waveguide, a cover disposed over said slot, a tube extending through said waveguide, said tube entering said waveguide by passing under said cover and through said slot, a small acute angle being formed between said tube and said wall, means connected to said tube to provide for the passage of a stream of water through said tube, a jacket in contact with said waveguide in a heat transfer relationship therewith, and inlet and outlet connections to said jacket providing for the passage of said water through said jacket.

References Cited in the file of this patent
UNITED STATES PATENTS

| | | |
|---|---|---|
| 2,562,921 | Kandoian | Aug. 7, 1951 |
| 2,716,192 | Johnson | Aug. 23, 1955 |

OTHER REFERENCES

Montgomery: Technique of Microwave Measurements, vol. 11, M. I. T. Rad. Lab. Series, December 18, 1947, pp. 199–213.

IRE Transactions, vol. MTT-3, No. 2, March 1955, page 27.